Nov. 14, 1950   G. B. JONES ET AL   2,529,949
CUTTER
Filed March 11, 1948

Geoffrey B. Jones
Bernard E. Jones
INVENTORS

BY *Clarence A. O'Brien*
*and Harvey B. Jacobson*
Attorneys

Patented Nov. 14, 1950

2,529,949

UNITED STATES PATENT OFFICE 2,529,949

CUTTER

Geoffrey B. Jones, Oak Park, and Bernard E. Jones, Oakland, Mich.

Application March 11, 1948, Serial No. 14,216

5 Claims. (Cl. 30—186)

This invention relates to new and useful improvements in cutting tools and the primary object of the present invention is to provide a plier-type cutter including novel and improved cutter blades which are very quickly and readily removed therefrom for replacement.

Another important object of the present invention is to provide a cutter tool including removable cutter blades which will permit the replacement of the blades in a convenient manner in order to retain the cutting edges of the tool sharp at all times, thus preventing a loose pivotal connection between the cutter handles which usually occurs due to improper sharpening or sharpness of the cutting edges of such tools.

A further object of the present invention is to provide a cutting tool including a pair of holding jaws and replaceable cutting blades carried by said jaws which are applied to the jaws are removed therefrom manually without the necessity of having to employ special tools.

A still further aim of this present invention is to provide a cutting tool that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
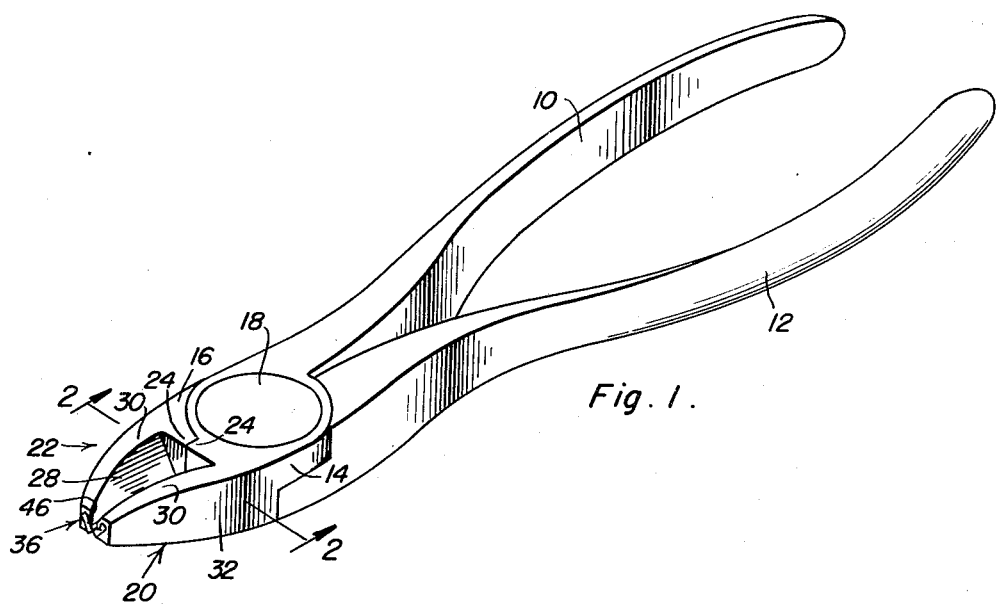
Figure 1 is a perspective view of the cutter constructed in accordance with the present invention.
Figure 2:
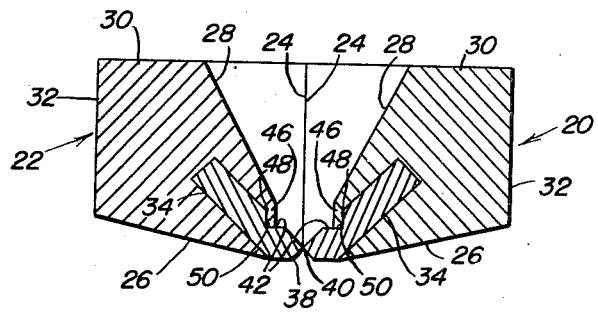
Figure 2 is an enlarged transverse vertical sectional view taken substantially on the plane of section line 2—2 of Figure 1; and, Figure 3 is a perspective view of one of the cutter blades that is used in conjunction with the present invention.
Figure 3:
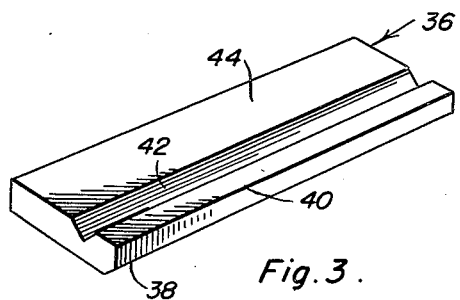

Referring now to the drawing in detail, wherein for the purpose of illustration, there is disclosed a preferred embodiment of the present invention, the numerals 10 and 12 represent a pair of arcuate levers or handles which terminate in rounded end portions 14 and 16 the opposing faces of which are notched to engage each other. Opposed apertures are provided in these rounded end portions 14 and 16 and receive a pivot pin 18.

Integrally formed with the rounded end portions 14 and 16 and projecting outwardly therefrom, is a pair of companion jaws 20 and 22 each of which is provided with a stop shoulder or bearing face 24, an inclined lower face 26, an inclined inner face 28, an arcuate upper face 30, and an arcuate outer face 32.

An inclined channeled guide 34 is provided in each of the jaws 20 and 22 and the guides 34 slidably engage substantially rectangular cutter blades or plates which are designated generally by the numeral 36. It is preferred, that these blades be formed from high carbon steel to increase the durability of the same and to retain the cutting edges of the same in a sharp condition during long periods of use. These cutter blades 36 are provided with a bevelled longitudinal edge 38 to form opposed cutting edges 40, and the outer ends or transverse edges of the blades 36 are preferably flush with the outer ends of the jaws 20 and 22.

Frictionally engaging substantially V-shaped retaining grooves 42 provided in the inner opposed faces 44 of the cutter blades 36, are retainer plates or shoulders 46 which are integrally formed with the jaws 20 and 22. The inner faces 48 of the retainer plates 46 frictionally engage one face of the retainer grooves 42 and the outer extremities 50 of the retainer plates 46 frictionally engage the remaining faces of the retaining grooves 42 to prevent loose engagement of the cutter blades in the channel guides 34 and to gauge the cutting edges 40 of the blades into a correct aligned position.

It should be noted that the cutting blades and channeled guides 34 are perpendicular to each other and that the same are disposed substantially midway between the inclined lower faces 26 and inclined inner faces 28 of the jaws 20 and 22 to provide additional rigidity for the cutter blades and to prevent undue weakness to the jaws 20 and 22 resulting from the formation of the channel guides therein.

The cutter blades are conveniently removed or replaced by hand, however, a suitable tool may be employed to aid such an operation if necessary. When replacing the cutter blades, it is essential that the guides 34 be cleaned of any foreign matter which would interfere with the correct positioning of the cutter blades and which would restrict the removal of the cutter blades from the said channel guides.

In view of the foregoing description taken in conjunction with the accompanying drawing it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A cutting tool comprising a pair of pivoted levers terminating in inwardly tapered companion jaws, said jaws having opposed, downwardly and inwardly inclined faces, a channeled guide provided in each of said inclined faces, the channel guides of said jaws being perpendicular to each other, cutter blades slidably positioned in said guides, said blades having retainer grooves, and retainer shoulders integrally formed with said jaws and received in said retainer grooves.

2. A cutting tool comprising a pair of pivoted levers terminating in companion jaws, said jaws having opposed, inclined faces, a longitudinally extending channeled guide groove provided in each of said jaws, a pair of cutter blades slidably received in said grooves, longitudinal, substantially V-shaped retainer grooves provided in said blades, and a retainer shoulder integrally formed with each of said jaws and received in said retainer grooves, said shoulders bearing against both walls of said retainer grooves.

3. The combination of claim 2 wherein said guide grooves are perpendicular to each other.

4. A cutting tool comprising a pair of pivoted levers terminating in companion jaws, said jaws including inclined inner faces and inclined lower faces, said jaws including inner portions, longitudinal, channeled guide grooves provided in the inner portions of said jaws substantially midway between the inner and lower faces of said jaws, said grooves being perpendicular to each other, a pair of elongated blades slidably received in said guide grooves, substantially V-shaped recesses provided in said blades, and shoulders integrally formed with said jaws and received in said recesses, said shoulders including inner faces bearing against one face of each of said recesses and outer extremities bearing against the remaining faces of said recesses.

5. A cutter tool comprising a pair of pivoted levers terminating in companion jaws, said jaws tapering inwardly and downwardly to provide sloping inner faces and lower faces, channeled guide grooves provided in said jaws substantially midway between the inner faces and the lower faces of said jaws, a pair of substantially rectangular cutter blades slidably received in said guide grooves and including beveled longitudinal edges projecting outwardly from said guide grooves, longitudinal substantially V-shaped retainer grooves provided in said blades adjacent the beveled longitudinal edges thereof, and shoulders integrally formed with said jaws having inner surfaces bearing against one wall of each of said retainer grooves and outer edges bearing against the remaining walls of said retainer grooves.

GEOFFREY B. JONES.
BERNARD E. JONES.

REFERENCES CITED

The following references are of record in the file of this patent:

UNITED STATES PATENTS

| Number | Name | Date |
|---|---|---|
| 344,641 | Donovan | June 29, 1886 |
| 458,860 | Root | Sept. 1, 1891 |
| 1,862,556 | Welhaven | June 14, 1932 |